United States Patent
Desvigne (10) Patent No.: US 11,214,379 B2
(45) Date of Patent: Jan. 4, 2022

(54) AIRCRAFT HAVING A STATIC AIR INLET SYSTEM WITH A SEPARATOR, AND AN ANTIVIBRATION METHOD

(71) Applicant: AIRBUS HELICOPTERS, Marignane (FR)

(72) Inventor: Damien Desvigne, Aix en Provence (FR)

(73) Assignee: Airbus Helicopters, Marignane (FR)

(*) Notice: Subject to any disclaimer, the term of this patent is extended or adjusted under 35 U.S.C. 154(b) by 861 days.

(21) Appl. No.: 15/962,179

(22) Filed: Apr. 25, 2018

(65) Prior Publication Data
US 2018/0312269 A1   Nov. 1, 2018

(30) Foreign Application Priority Data

Apr. 27, 2017   (FR) ........................................ 1770425

(51) Int. Cl.
| | | |
|---|---|---|
| B64D 33/02 | (2006.01) | |
| B64C 27/04 | (2006.01) | |
| B64C 27/00 | (2006.01) | |
| F02C 7/045 | (2006.01) | |

(52) U.S. Cl.
CPC ............ B64D 33/02 (2013.01); B64C 27/001 (2013.01); B64C 27/04 (2013.01); F02C 7/045 (2013.01); *B64D 2033/0206* (2013.01); *B64D 2033/0253* (2013.01); *B64D 2033/0293* (2013.01)

(58) Field of Classification Search
CPC ............ B64D 33/02; B64D 2033/0206; B64D 2033/0226; B64D 2033/0253; F02C 7/045; F02C 7/055
See application file for complete search history.

(56) References Cited

U.S. PATENT DOCUMENTS

| | | | |
|---|---|---|---|
| 2002/0182062 A1 | 12/2002 | Scimone | |
| 2015/0122954 A1* | 5/2015 | Lamb, Jr. ................ | F02C 7/042 244/76 R |

FOREIGN PATENT DOCUMENTS

| | | |
|---|---|---|
| AU | 621216 | 3/1992 |
| EP | 2743178 A1 | 6/2014 |
| EP | 2853493 A1 | 4/2015 |
| EP | 2995556 A1 | 3/2016 |

OTHER PUBLICATIONS

Notice of Preliminary Rejection for Korean Application No. 10-2018-0049310, dated Jun. 21, 2019, 4 Pages.
French Search Report for French Application No. FR1770425, Completed by the French Patent Office, dated Jan. 18, 2018, 6 pages.

* cited by examiner

*Primary Examiner* — Nicholas McFall
(74) *Attorney, Agent, or Firm* — Brooks Kushman P.C.

(57) ABSTRACT

An aircraft having a static air inlet system. The static air inlet system comprises a static air intake, the static air intake having a through opening formed in a top structural assembly, the through opening forming an interface between a medium and an inside space of the top structural assembly. The static air inlet system has at least one separator subdividing the through opening into at least two distinct slots, the separator comprising a first portion extended by a second portion, the first portion extending inside the inside space and the second portion extending outside the inside space.

20 Claims, 3 Drawing Sheets

AIRCRAFT HAVING A STATIC AIR INLET SYSTEM WITH A SEPARATOR, AND AN ANTIVIBRATION METHOD

CROSS-REFERENCE TO RELATED APPLICATIONS

This application claims priority to French patent application No. FR 1770425 filed on Apr. 27, 2017, the disclosure of which is incorporated in its entirety by reference herein.

BACKGROUND OF THE INVENTION

(1) Field of the Invention

The present invention relates to an aircraft having a static air inlet system with a separator, and to an antivibration method. The invention thus lies in the technical field of air inlet systems feeding air to a power plant of an aircraft. More particularly, the invention relates to a rotary wing aircraft.

2) Description of Related Art

A rotorcraft is usually provided with an airframe defined by an outer shell. The airframe has a front segment carrying in particular a main rotor. The front segment may be extended by a rear assembly. The rear assembly may comprise a tail boom optionally carrying a rotor for controlling yaw movement of the rotorcraft, and/or a tail plane and/or a tail fin.

In addition, a rotorcraft usually has a power plant comprising at least one engine together with at least one main power transmission gearbox (MGB). For example, a rotorcraft has at least one engine for driving at least one main rotor in rotation via an MGB. The main rotor contributes at least in part to providing the rotorcraft with lift and possibly also with propulsion.

Under such circumstances, the front segment may comprise from bottom to top, a bottom section, a central portion including a cockpit, and then a top portion. The power plant may be supported by a platform known as a "support platform", and may be situated either in the central portion or else in the top portion.

The main rotor overlies the top portion.

Furthermore, the top portion includes a top structural assembly of the outer shell forming coverings that surround an inside space. The inside space receives the power plant or it is in fluid flow communication with the power plant. The term "covering" may designate a cover, a moving structure, a fairing, a streamlined or partitioned box, . . . . Optionally, the top structural assembly is optimized to limit the aerodynamic drag of the aircraft. The top structural assembly may have a front face facing towards the front of the aircraft, a rear face facing towards the rear of the aircraft, a top face facing towards a main rotor, and two side faces.

In order to take air coming from outside the aircraft and to convey it to the power plant, the aircraft includes an air inlet system.

For example, an air inlet system may be fitted to the top portion. Such an air inlet system includes at least one air intake formed in the top structured assembly. The air intake leads to the inside space of the top portion. Two types of air inlet system are known.

A first air inlet system is said to be "dynamic". Such a first air inlet system has a dynamic air intake that is fed with outside air mainly under the effect of the speed of advance of the aircraft. The dynamic air intake may be arranged relative to the inside space that is in fluid flow communication with the power plant, in a direction that is upstream with reference to a direction going from the nose of the aircraft towards the tail of the aircraft. The dynamic air intake is thus arranged to face a stream of air while the aircraft is advancing forwards. For example, the dynamic air intake is arranged in a front face of the top structural assembly. The air intake can also define a through opening that is substantially normal to the stream of air while the aircraft is advancing forwards and that faces this air stream. Because of this arrangement, a first air inlet system is sometimes referred to as an "axial air inlet".

The use of a first air inlet system is particularly advantageous during a stage of forward flight of the aircraft. In contrast, during a stage of hovering flight, such a first air inlet system provides lower performance.

A second air inlet system is said to be "static". A static second air inlet system has a static air intake that is fed with outside air mainly under the effect of the suction generated by one or more engines. The static air intake defines a through opening that does not face directly into the incident stream of air while the rotorcraft is advancing.

The static air intake can be arranged relative to the inside space that is in fluid flow communication with the power plant, in a direction that is downstream with reference to the direction going from the nose of the aircraft towards the tail of the aircraft. The static air intake may also be arranged in the side of such an inside space. Thus, a static air intake may be arranged in a rear face of the top structural assembly and thus in a direction opposite to the air flow direction, or in a side face or a top face of the top structural assembly.

Optionally, a rotorcraft may have both a dynamic air inlet system and a static air inlet system.

Depending on the architecture of a rotorcraft and on the missions it is to perform, using a static air inlet system is found to be advantageous. Specifically, a static air inlet system usually presents high performance during hovering flight, during which the power plant requires a large air stream in order to generate high power. By way of example, the H130® helicopter has a static air inlet system for feeding air to the main engine.

Furthermore, a static air inlet system or a dynamic air inlet system may include a grid arranged across the air intake. Conventionally, such a grid serves to preserve the power plant from interference, such as sand and foreign bodies, and to avoid ingesting a bird.

Optionally, a drip collector may also be installed in order to protect the power plant from trickling water.

Documents US 2002/182062, EP 2 853 493, EP 2 743 178, AU 621216, and EP 2 995 556 are known.

BRIEF SUMMARY OF THE INVENTION

An object of the present invention is thus to provide a novel static air inlet system that tends to reduce a level of vibration in a rotorcraft.

According to the invention, an aircraft is provided with a static air inlet system for sucking in outside air present in a medium outside the aircraft and for conveying said outside air to at least one engine of the power plant of the aircraft, said aircraft having a front segment that includes a main rotor contributing at least to providing the aircraft with lift, said aircraft also including a rear assembly.

The rear assembly may comprise at least one tail boom and/or at least one tail fin and/or at least one tail plane and/or at least one system for controlling yaw movement, such as a tail rotor for example.

Furthermore, the aircraft extends longitudinally along an anteroposterior plane in a direction of forward advance from a rear end of the rear assembly to a nose of the front segment, said aircraft extending transversely from a first flank to a second flank on either side of the anteroposterior plane, said front segment having a top structural assembly situated under the main rotor, said static air inlet system comprising a static air intake, said static air intake having a through opening formed in said top structural assembly, said through opening forming an interface between said medium and an inside space of said top structural assembly.

The top structural assembly may have a rear face facing towards the rear assembly and a top face facing towards the main rotor and defining in part an inside space of said top structural assembly. The static air intake may include a through opening formed in the rear face or the top face of the top structural assembly.

Furthermore, the static air inlet system has at least one separator subdividing said through opening into at least two distinct slots, said separator comprising a first portion extended by a second portion, the first portion extending inside said inside space and the second portion extending outside said inside space.

Under such circumstances, the through opening puts the inside face into fluid flow communication with a medium that is outside the aircraft. This through opening is subdivided by at least one separator into at least two distinct flow areas, which are referred to as "slots" for convenience.

The anteroposterior plane may be a vertical plane of symmetry of the aircraft extending along a longitudinal reference axis and a reference axis in elevation of the aircraft.

The top structural assembly then includes coverings for defining at least one inside space. The power plant may be located in that inside space, or it may be in fluid flow communication therewith.

An aircraft is subject to the risk of the appearance of a phenomenon known as "tail shake". This phenomenon is a vibratory phenomenon of the rear assembly of the rotorcraft during which the rear assembly vibrates under the effect of a turbulent air stream that usually comes from high portions that may be stationary (separations of an air stream at the covers or in the vicinity of projections), or indeed dynamic (separation of an air stream at the rotor head of the main rotor).

An air stream separating at the top structural assembly can thus generate a turbulent air stream that is directed towards the rear assembly. Whirling streams of air can then excite a rear assembly of the aircraft over a broad frequency band. Such whirling air structures can therefore excite a tail boom and/or a tail fin and/or a tail plane at a frequency that is equal to one of the resonant modes in bending or twisting of the tail boom and/or the tail fin and/or the tail plane, thereby leading to the appearance of the tail-shake phenomenon.

In addition, the aerodynamic drag of the aircraft may be increased significantly, thus tending to reduce the range of the aircraft, or more generally to reduce the performance of the rear assembly.

The present invention thus proposes providing the aircraft with a static air inlet system that is provided in particular with a separator. The separator includes an internal portion that is located in the inside space of the top structural assembly. The separator also includes an external portion located outside the inside space, e.g. substantially parallel to the flow of the surrounding air. The internal portion is important for combating the tail-shake phenomenon. The advantage of this internal portion is in particular not obvious insofar as the harmful turbulence is situated outside the static air inlet. Conversely, the outside portion may, surprisingly, be relatively short, but may be oriented parallel relative to the surrounding air flow.

Specifically, the Applicant has observed that, contrary to prejudice, the operation of a prior art static air inlet can have an impact on the aircraft other than during a stage of hovering flight. A static air inlet is capable of disturbing the flow of air in the vicinity of the aircraft by effects of interaction with that flow of air during a stage of forward flight.

Under such circumstances, the separator serves to reduce significantly the lateral aerodynamic interactions associated with sucking air into the air inlet system. The separator thus makes it possible to reduce the destabilization of the surrounding turbulent structures that are conveyed downstream. Reducing aerodynamic interactions from the static air intake by means of the separator can lead to a reduction in the magnitude and/or to a change in the spectral signature of the turbulence generated by the high portions of the aircraft, i.e. by the top structural assembly and by the main rotor. The risk of the tail-shake phenomenon appearing is thus reduced.

Such a separator can also have an impact on the ability of the static air inlet system to suck in air that is negligible.

Furthermore, the dimensions of the separator can be minimized in order to ensure the separator is of relatively small weight.

Under such circumstances, the separator serves to limit any risks of the tail-shake phenomenon occurring, while having an impact that is otherwise limited.

Furthermore, reducing aerodynamic interactions by the static air intake can indeed improve the aerodynamic efficiency of the rear assembly since it is operating in an air stream that is less disturbed.

In addition, the aerodynamic drag of the aircraft can be reduced.

The aircraft may also include one or more of the following characteristics, which characteristics can be combined with one another.

In an aspect, it is possible to install a plurality of separators. For example, the separators may define a plurality of slots, each having a transverse size that is substantially equivalent. By way of illustration, two separators can organize three slots extending transversely over distances that are substantially equal to one-third of the transverse length of the static air intake.

In an aspect, the second portion may extend in a longitudinal direction that is substantially parallel to the anteroposterior plane and/or to the flow direction of said outside air around the through opening while said aircraft is performing forward flight in the absence of wind and without sideslip.

Placing the second portion longitudinally and thus substantially parallel relative to the surrounding flow, i.e. the flow in the immediate proximity of the separator, can be beneficial for the operation of the invention.

In an aspect, the separator may extend transversely in a transverse direction from a first side face to a second side face, said transverse direction being perpendicular to the anteroposterior plane, and said first side face and said second side face may be arranged transversely on either side of said anteroposterior plane.

The first side face and the second side face may be symmetrical or asymmetrical relative to each other about the anteroposterior plane.

In another aspect, the first side face and the second side face may be plane or curved, for example.

In an aspect, the separator may have a width lying transversely between the first side face and the second side face, said width being less than one centimeter.

The term "width" refers to the spacing between the first side face and the second side face. Each point of the first side face is spaced apart from the corresponding point of the second side face by a said spacing that is referred to as "width", these two points being situated on a straight line orthogonal to a reference plane.

The term "said width being less than one centimeter" means that the greatest width between two points of the separator is less than one centimeter.

Such a width serves to limit the impact of the separator on sucking in outside air.

The width of the separator may be constant. For example, the first side face and the second side face may be parallel.

Alternatively, said width need not be constant, said separator presenting a predetermined relationship for width.

The first side face and the second side face are then not parallel to each other.

In an aspect, the first side face may extend from a first front end edge to a first rear end edge, the second side face extends from a second front end edge to a second rear end edge and said separator may have a rounded front end face connecting the first front end edge to the second front end edge, and also has a rounded rear end face connecting the first rear end edge to the second rear end edge.

The term "rounded" means an edge face that is curved without any sharp points. Each edge face may be made up of sections that are circularly arcuate, elliptically arcuate. By way of example, each edge face may be in the form of a half-cylinder or a half-cone on a base that is circular or elliptical.

In an aspect, the through opening may present a predetermined characteristic dimension, said characteristic dimension being equal to the square root of the area of a projection of said through opening onto a projection plane, said projection plane being orthogonal to a flow direction of said air around the through opening when said aircraft is performing forward flight in the absence of wind and without sideslip, said first portion may extend inside said inside space in a direction that is parallel to said anteroposterior plane over a first length that is longer than or equal to one-fourth of said predetermined characteristic dimension.

The term "first length" designates the smallest dimension of the first portion parallel to the direction of forward advance of the aircraft, i.e., by way of example, substantially in the direction going from the tail to the nose of the aircraft.

In an aspect, said through opening presents a predetermined characteristic dimension that is equal to the square root of the area of a projection of said through opening onto a projection plane, said projection plane being orthogonal to a flow direction of said air around the through opening when said aircraft is performing forward flight towards the front in the absence of wind and without sideslip, and said second portion extends outside said inside space in said flow direction over a second length that is longer than or equal to half said predetermined characteristic dimension.

In an aspect, said first length may be longer than half said predetermined characteristic dimension, said second length lying in the range one-half said predetermined characteristic dimension to a first quotient, which first quotient is equal to nine times said predetermined characteristic dimension D, divided by four, i.e. 9D/4.

In an aspect and by way of example in the presence of a through opening that is circular, the first length lies in the range one-fourth of said predetermined characteristic dimension to a second quotient, the second quotient being equal to nine times said predetermined characteristic dimension D divided by sixteen, i.e. 9D/16. The second length lies in the range one-half said predetermined characteristic dimension to a first quotient, the first quotient being equal to nine times said predetermined characteristic dimension D divided by four, i.e. 9D/4.

In an aspect, said at least two slots may be symmetrical relative to said separator.

In an aspect, said second portion may extend in elevation over a height from a base to a top, said second portion may extend longitudinally from a first end, optionally secured to the first portion, to a second end, and said height may decrease on going from the first end towards the second end in application of a predetermined relationship for variation of said height.

In an aspect, said second portion may extend longitudinally from upstream to downstream of the through opening relative to the flow direction of said outside air relative to the aircraft, said separator being T-shaped.

In an aspect, said through opening may describe a disk that is centered on an axis of symmetry and that presents a diameter, the axis of symmetry separating an upstream segment from a downstream segment of said second portion, the upstream segment extending over an upstream extension length and the downstream segment extending over a downstream extension length, each of the upstream extension length and the downstream extension length being equal to said second length.

The axis of symmetry may be parallel to the anteroposterior plane.

In addition to an aircraft, the invention provides a method of treating a vibratory phenomenon, in particular the phenomenon known as "tail-shake", of an aircraft having a static air inlet system for sucking in outside air present in a medium outside the aircraft and for conveying said outside air to at least one engine of the power plant of the aircraft, said aircraft having a front segment that carries a rotor contributing at least to providing the aircraft with lift, said aircraft also including a rear assembly, said aircraft extending longitudinally along an anteroposterior plane in a direction of forward advance from a rear end of the rear assembly to a nose of the front segment, said aircraft extending transversely from a first flank to a second flank on either side of the anteroposterior plane, said front segment having a top structural assembly situated under the main rotor, said static air inlet system comprising a static air intake, formed in said top structural assembly, said static air intake having a through opening, said through opening forming an interface between said outside medium and an inside space of said top structural assembly.

The method includes the following steps: arranging at least one separator subdividing said through opening into at least two distinct areas, said separator comprising a first portion extended by a second portion, the first portion extending inside said inside space and the second portion extending outside said inside space.

In addition, the method may present at least one of the characteristics described above.

BRIEF DESCRIPTION OF THE DRAWINGS

The invention and its advantages appear in greater detail from the following description of embodiments given by way of illustration and with reference to the accompanying figures, in which.

DETAILED DESCRIPTION OF THE INVENTION

Elements that are present in more than one of the figures are given the same references in each of them.

Three mutually orthogonal directions X, Y, and Z are shown in the figures.

The first direction X may represent a longitudinal reference axis.

The second direction Y may represent a transverse reference axis.

And finally, the third direction Z is said to be in elevation.

Figure 1:
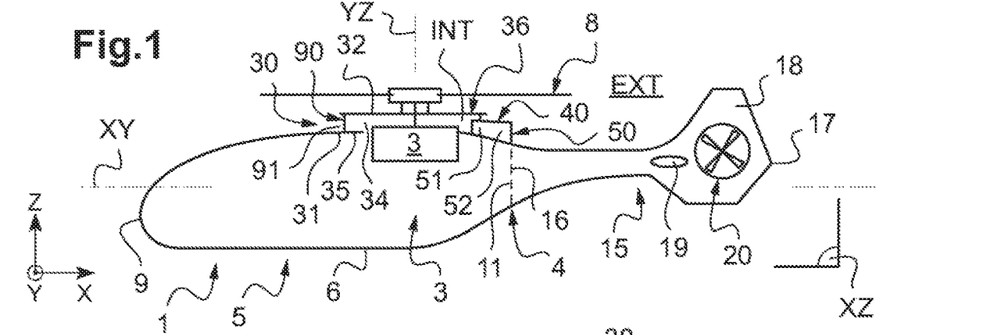
FIG. 1 is a diagram of an aircraft of the invention.

FIG. 1 shows an aircraft 1 of the invention.

The aircraft 1 has a front segment 5 and a rear assembly 15. In particular, the front segment 5 and the rear assembly 15 extend one after the other along the first axis X.

The aircraft 1 extends transversely on either side of a vertical anteroposterior plane XZ from a first flank 3 to a second flank 4.

The aircraft 1 also extends longitudinally along the anteroposterior plane XZ and in a direction of forward advance of the aircraft, from a rear end 17 of a tail of the rear assembly to a nose 9 of the front segment. Thus, on either side of a transverse plane YZ, the aircraft 1 presents a front portion including said nose 9 and a rear portion including the rear end 17.

The aircraft 1 also extends upwards from a bottom towards a top. Thus, on either side of a "horizontal" plane XY, the aircraft 1 presents a top section including said top and a bottom section including said bottom.

The anteroposterior plane XZ, the transverse plane YZ, and the horizontal plane XY are mutually perpendicular.

From bottom to top, the front segment 5 may comprise a bottom section having a bottom 6 and optionally provided with landing gear, a central portion 7 optionally provided with a cockpit, and then a top structural assembly 30. A main rotor 8 overlies the top structural assembly 30 and contributes to providing the aircraft 1 with lift and possibly also with propulsion.

Furthermore, the rear assembly 15 may comprise at least one tail boom 16 carrying at least one tail plane 19 and/or at least one tail fin 18 and/or at least one device 20 for controlling the yaw movement of the aircraft 1. By way of example, the device 20 for controlling the yaw movement of the aircraft 1 includes a tail rotor.

Furthermore, the front segment 5 houses a power plant 2 driving the main rotor 8, and possibly also driving a device 20 for controlling the yaw movement of the aircraft 1.

Under such circumstances, the top structural assembly 30 may include various coverings for defining an internal space INT. At least one engine of the power plant 2 may then be housed in this internal space INT, or may be in fluid flow communication with this internal space INT.

Thus, the top structural assembly 30 may have a front face 31 facing towards the front of the aircraft, a rear face 33 facing towards the rear assembly of the aircraft, a top face 32 facing towards the main rotor 8, a platform 35, and two lateral sides 34 and 36 so as to form an enclosure defining the internal space INT, at least in part.

In order to take in air coming from a medium EXT outside the aircraft 1, the aircraft 1 includes at least one air inlet system putting the inside space INT into fluid flow communication with said medium EXT.

By way of example, a dynamic air inlet system 90 may feed the inside space with outside air during forward advance of the aircraft. By way of illustration, the dynamic air inlet system 90 may comprise a dynamic air inlet 91 provided in said front face 31, and/or lateral scoops.

Independently of this possibility, the aircraft 1 includes a static air inlet system 40.

The static air inlet system 40 includes a static air intake 41. This static air intake 41 has a through opening 42 passing through the top structural assembly 30. Under such circumstances, the through opening 42 acts as an open interface between the medium EXT outside the aircraft and the inside space INT. Under the effect mainly or exclusively of suction from at least one engine of the power plant, said air penetrates into the inside space INT by passing through the through opening 42.

A vector normal to the through opening 42 can then be directed substantially parallel to a flow direction 200 of air in the immediate proximity of the aircraft while the aircraft is performing forward flight without wind and without sideslip, this normal vector going from the through opening away from the inside space INT. For example, the through opening 42 is thus formed in the rear face 33.

In a variant that is described below, the normal vector may be orthogonal to this flow direction 200. For example, the through opening 42 could thus be made in the top face 32.

Figure 2:
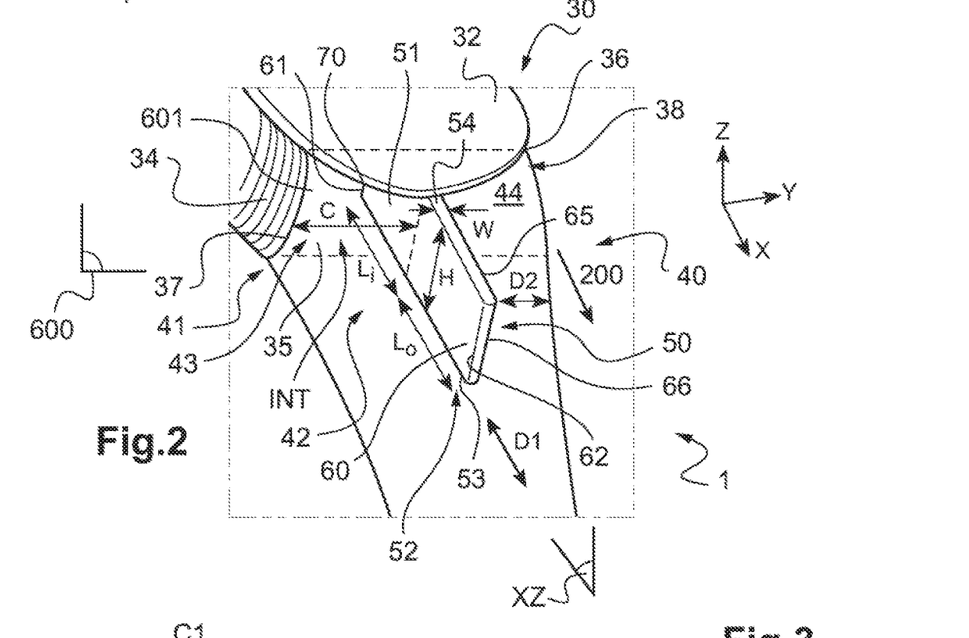
FIG. 2 is a diagram showing a separator.

With reference to FIG. 2, the static air inlet system 40 includes at least one separator 50. The separator 50 subdivides the through opening 42 into at least two inlets referred to as "slots" 43 and 44 that are distinct and possibly symmetrical. The separator 50 has a first portion 51 that extends in the inside space over the full height of the through opening in order to form the two slots. In position, the first portion 51 may extend in an air suction direction ASP1 parallel to a direction of forward advance of the aircraft over a first length Li. By way of example, the two slots 43 and 44 are symmetrical to each other about the separator 50.

The first portion 51 is extended by a second portion 52 of the separator that extends outside the inside space INT. In particular, the second portion 52 may extend in a direction that is parallel to the direction of forward advance of the aircraft over a second length Lo. By way of example, the second portion 52 extends over the second length Lo in a longitudinal direction D1 that is substantially parallel to the anteroposterior plane XZ and/or to the flow direction 200.

The separator 50 extends transversely in a transverse direction D2 that is perpendicular to the anteroposterior plane XZ, from a first side face 60 to a second side face 65. Each of the first and second side faces 60 and 65 includes a fraction present in the first portion and a fraction present in the second portion 52.

Optionally, the first side face 60 and the second side face 65 are arranged transversely on either side of the anteroposterior plane XZ, e.g. symmetrically relative to each other.

In one aspect and in the presence of a single separator, the same lateral distance C then separates the separator transversely from two edges 37, 38 of the air intake.

Furthermore, the width W of the separator is represented by the transverse spacing between the first side face 60 and the second side fade 65.

This width W may be less than one centimeter.

Furthermore, the width W may be constant as shown in FIG. 2, or in other variants it may vary between different points, presenting a predetermined width relationship.

In another aspect, the first side face 60 extends longitudinally from a front first end edge 61 towards a rear first end edge 62. The term "end edge" designates an end. Likewise, the second side face 65 extends longitudinally from a second front end edge (not shown in FIG. 2) towards a second rear end edge 66. Under such circumstances, the separator 50 may include a rounded front end face 70 that connects the first front end edge 61 to the second front end edge, and a rear rounded end face 71 that connects the first rear end edge 62 to the second rear end edge 66.

The term "rounded" refers to a "curved" shape, that need not necessarily be circular.

Furthermore, the first portion 51 may extend over a height that is equal to the height of the inside space INT so that the two slots 43 and 44 are separated completely.

The second portion 52 may extend in elevation over a height H from a base 53 to a top 54. This height H may be constant or it may vary in compliance with a predetermined variation relationship for said height on going from the first end 55 towards the second end 56 of the second portion 52.

In this context, the separator may be defined by one or more relationships for height H and/or for a first length Li and/or for a second length Lo and/or for width W and/or for a lateral centering distance C and/or for a shape plane for the first lateral face 60 and/or for a shape plane for the second lateral face 65 and/or for the shape of the front edge 70 and/or for the shape of the rear edge 71.

One or more of these dimensions may be determined as a function of a predetermined characteristic dimension D of the air intake. This predetermined characteristic dimension D is equal to the square root of the area of a projection 601 of said through opening 42 onto a projection plane 600, possibly ignoring the obstruction of the separators, said projection plane being orthogonal to the flow direction 200 of said air around the through opening 42 when said aircraft is performing forward flight towards the front in the absence both of wind and of sideslip.

Thus, the first portion 51 may extend over a first length Li that is greater than or equal to one-fourth of the predetermined characteristic dimension D.

The second portion 52 may extend over a second length Lo that is greater than or equal to one-half of the predetermined characteristic dimension D.

Figure 3:
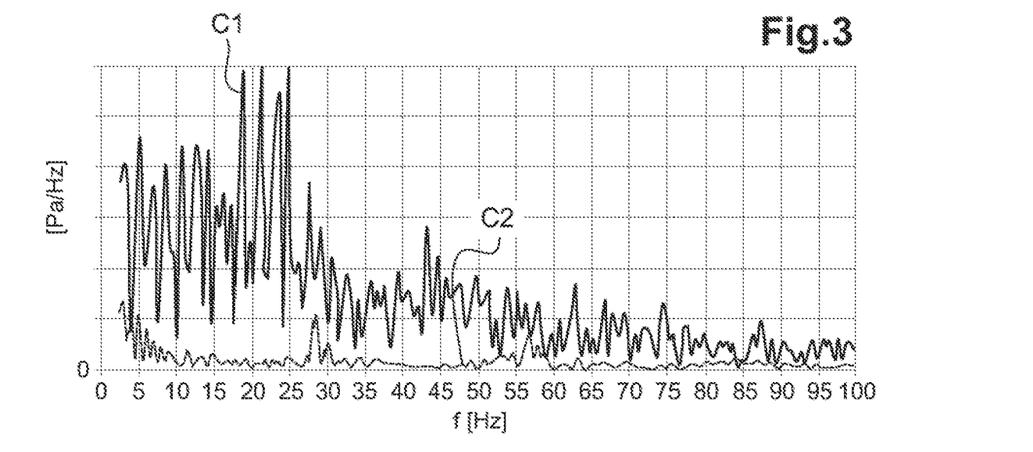
FIG. 3 is a plot showing the advantage of the invention.

FIG. 3 is a plot showing the advantage of the invention. This plot presents frequency along the abscissa axis and the modulus of the Fourier transform of fluctuating pressure expressed in pascals (Pa) per hertz (Hz) up the ordinate axis. In equivalent manner, the ordinate could represent the power spectrum density expressed in pascals squared (Pa$^2$) per hertz (Hz).

The curve C1 shows the presence of a flow that is highly turbulent in the absence of the separator. The curve C2 shows the pressure spectrum in the presence of the separator.

FIGS. 4 to 11 show various static air inlet systems of the invention.

In FIGS. 4 to 8, the through opening is orthogonal to a vector that is substantially parallel to a flow direction 200 of the air in the proximity of the separator and the aircraft.

Figure 4:
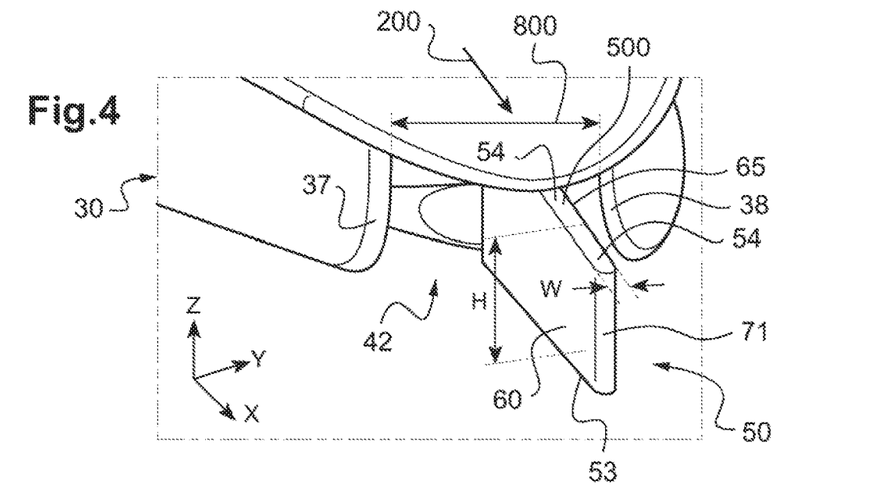
FIGS. 4 to 12 are diagrams showing static air inlet systems of the invention.
Figure 5:
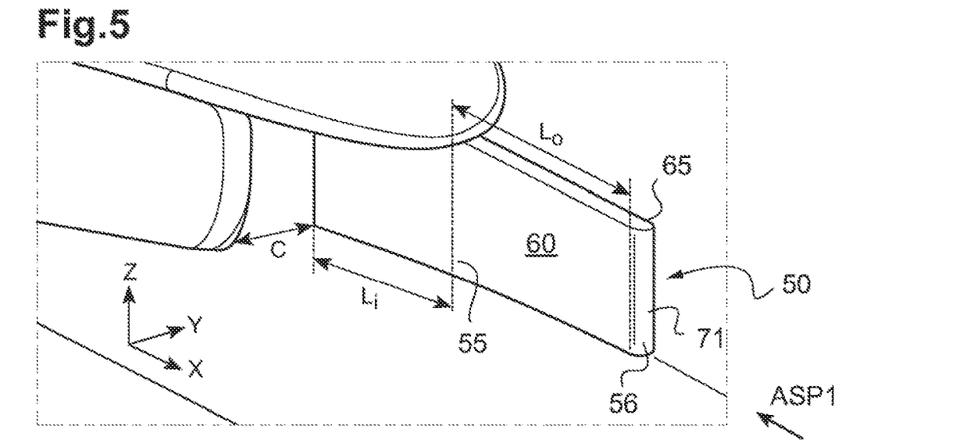

In FIGS. 4 and 5, the through opening 42 is C-shaped and extends between two side edges 37 and 38 of the top structural assembly 30.

The first side face 60 and the second side face are also parallel to each other. A plate 500 may connect together the tops of the first side face 60 and of the second side face 65.

In this example, the width W is constant. In contrast, the height H of the second portion decrees going away from the first portion 51.

The first side face 60 and the second side face 65 are both spaced apart from a side edge by a distance C that is equal to the difference between a length 800 across the through opening 42 minus the width W of the separator.

In addition, and with reference to FIG. 5, the first length Li may be greater than half the predetermined characteristic dimension D. The second length Lo may lie in the range one-half of the predetermined characteristic dimension D to a first quotient, which first quotient is equal to nine times the predetermined characteristic dimension D divided by four.

Figure 6:
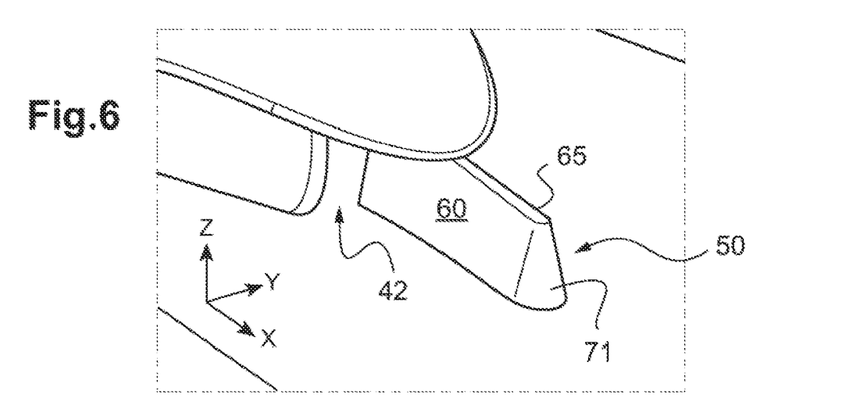

In the variant of FIG. 6, the width W varies.

Figures 7, 8, 9, 10, 11, 12, 13:
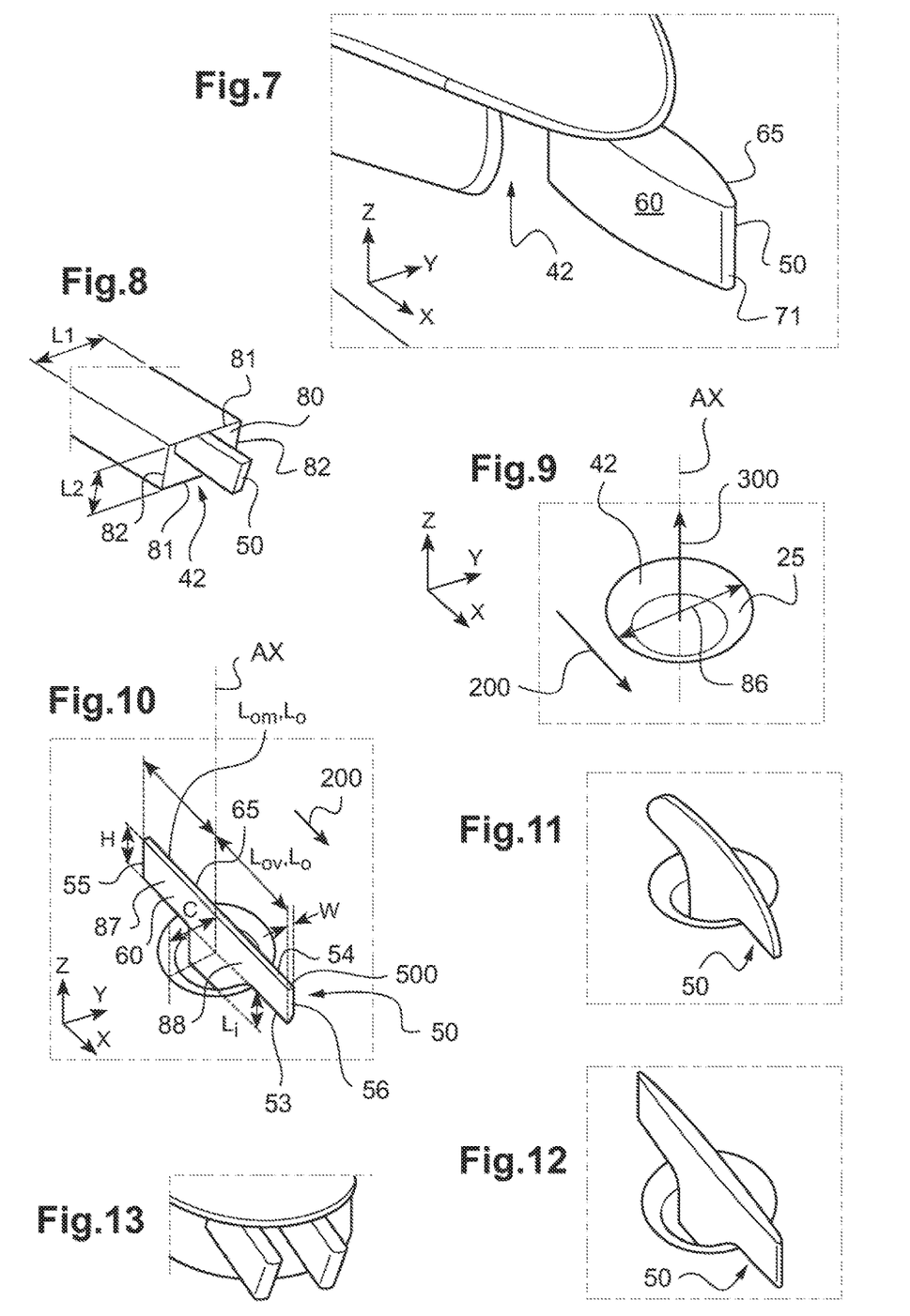
FIG. 13 is a diagram showing a system having two separators.

In the variant of FIG. 7, the first side face 60 and the second side face 65 are not parallel.

In the variant of FIG. 8, the through opening 42 may be in the shape of a parallelogram 80. The parallelogram 80 has four sides, two sides 81, each extending over a first extension distance L1, and two other sides 82, each extending over a second extension distance L2. Under such circumstances, the predetermined characteristic dimension D may be equal to the square root of the product of multiplying the first extension distance L1 by the second extension distance L2.

The above-described characteristics are applicable to the separator of FIG. 8.

In FIGS. 9 to 12, the through opening 42 may be in the shape of a disk 85 that is centered on an axis of symmetry AX and that presents a diameter 86. Under such circumstances, the predetermined characteristic dimension D may be equal to the square root of the number pi ($\pi$) multiplied by the diameter 86 divided by 2.

Optionally, and with reference to FIG. 10, the first length Li may lie in the range one-fourth of said predetermined characteristic dimension D to a second quotient, the second quotient being equal to nine times said predetermined characteristic dimension D divided by sixteen. The second length Lo may lie in the range one-half the predetermined characteristic dimension D to said first quotient equal to nine times said predetermined characteristic dimension D divided by four.

Furthermore, the first side face 60 and the second side face 65 are also parallel to each other. A plate 500 may connect together the tops or the bottoms of the first and second faces 60 and 65.

In this example, the width W is constant. Likewise, the height H of the second portion is constant.

The first side face 60 and the second side face 65 are each spaced apart from a side edge of the disk by a distance C that is equal to the difference between the diameter 86 and the width W of the separator.

Independently of these aspects, the through opening may be orthogonal to a vector 300 substantially normal to a flow direction 200 of air in the proximity of the aircraft.

Because of this orientation, the second portion 52 may extend longitudinally from upstream to downstream of the through opening 42 relative to the flow direction 200 of outside air relative to the aircraft 1. The second portion then has an upstream segment 87 and a downstream segment 88 that are united on the axis of symmetry AX.

Under such circumstances, the separator 50 is T-shaped, the internal portion forming the upright of said T-shape.

In addition, the upstream segment 87 may extend longitudinally over an upstream extension length Lom and the downstream segment may extend over a downstream extension length Lov. The upstream extension length Lom and the downstream extension length Lov may for example each be equal to the second length Lo.

The characteristics of the various variants described may be combined with one another.

Naturally, the present invention may be subjected to numerous variations and to its implementation. Although several embodiments are described, it will readily be understood that it is not conceivable to identify exhaustively all possible embodiments. It is naturally possible to envisage replacing any of the means described by equivalent means without going beyond the ambit of the present invention.

In particular, in an embodiment shown in FIG. 13, the system may have two separators.

What is claimed is:

1. An aircraft having a static air inlet system for sucking in outside air present in a medium outside the aircraft and for conveying the outside air to at least one engine of a power plant of the aircraft, the aircraft having a front segment that includes a main rotor contributing at least to providing the aircraft with lift, the aircraft also including a rear assembly; the aircraft extending longitudinally along an anteroposterior plane in a direction of forward advance from a rear end of the rear assembly to a nose of the front segment, the aircraft extending transversely from a first flank to a second flank on either side of the anteroposterior plane, the front segment having a top structural assembly situated under the main rotor, the top structural assembly having a front face facing towards the nose and in the direction of forward advance, a rear face facing towards the rear assembly, a first side face connecting the front and rear faces, a second side face connecting the front and rear faces, and a top face facing towards the main rotor, the static air inlet system comprising a static air intake, the static air intake having a through opening formed in the rear face, the first side face, the second side face, or the top face of the top structural assembly, the through opening forming an interface between the medium and an inside space of the top structural assembly, wherein the static air inlet system has at least one separator subdividing the through opening into at least two distinct slots, the separator comprising a first portion extended by a second portion, the first portion extending inside the inside space and the second portion extending outside the inside space.

2. The aircraft according to claim 1, wherein the second portion extends in a longitudinal direction parallel to a flow direction of the outside air around the through opening while the aircraft is performing forward flight in the absence of wind and without sideslip.

3. The aircraft according to claim 1, wherein the separator extends transversely in a transverse direction from a first separator side face to a second separator side face, the transverse direction being perpendicular to the anteroposterior plane, and the first separator side face and the second separator side face are arranged transversely on either side of the anteroposterior plane.

4. The aircraft according to claim 3, wherein the first separator side face extends from a first front end edge to a first rear end edge, the second separator side face extends from a second front end edge to a second rear end edge and the separator has a rounded front end face connecting the first front end edge to the second front end edge, and also has a rounded rear end face connecting the first rear end edge to the second rear end edge.

5. The aircraft according to claim 1, wherein the separator extends transversely in a transverse direction from a first separator side face to a second separator side face, the transverse direction being perpendicular to the anteroposterior plane, and the separator has a width separating the first separator side face and the second separator side face transversely, the width being less than one centimeter.

6. The aircraft according to claim 5, wherein the width is not constant, the separator presenting a predetermined relationship for width.

7. The aircraft according to claim 1, wherein the through opening presents a predetermined characteristic dimension, the characteristic dimension being equal to the square root of the area of a projection of the through opening onto a projection plane, the projection plane being orthogonal to a flow direction of the air around the through opening when the aircraft is performing forward flight in the absence of wind and without sideslip, the first portion extending inside the inside space in a suction direction of the air parallel to a direction of forward advance of the aircraft over a first length that is longer than or equal to one-fourth of the predetermined characteristic dimension.

8. The aircraft according to claim 7, wherein the through opening presents a predetermined characteristic dimension, the characteristic dimension being equal to the square root of the area of a projection of the through opening onto a projection plane, the projection plane being orthogonal to a flow direction of the air around the through opening when the aircraft is performing forward flight towards the front in the absence of wind and without sideslip, and the second portion extends outside the inside space in the flow direction over a second length that is longer than or equal to half the predetermined characteristic dimension, and wherein the first length is longer than half the predetermined characteristic dimension, the second length lying in the range one-half the predetermined characteristic dimension to a first quotient, which first quotient is equal to nine times the predetermined characteristic dimension divided by four.

9. The aircraft according to claim 7, wherein the through opening presents a predetermined characteristic dimension, the characteristic dimension being equal to the square root of the area of a projection of the through opening onto a projection plane, the projection plane being orthogonal to a flow direction of the air around the through opening when the aircraft is performing forward flight towards the front in the absence of wind and without sideslip, and the second portion extends outside the inside space in the flow direction over a second length that is longer than or equal to half the predetermined characteristic dimension, and wherein the second length lies in the range one-half of the predetermined characteristic dimension to a first quotient, the first quotient being equal to nine times the predetermined characteristic dimension divided by four, the first length lying in the range one-fourth of the predetermined characteristic dimension to a second quotient, the second quotient being equal to nine times the predetermined characteristic dimension (D) divided by sixteen.

10. The aircraft according to claim 1, wherein the through opening presents a predetermined characteristic dimension, the characteristic dimension being equal to the square root of the area of a projection of the through opening onto a projection plane, the projection plane being orthogonal to a flow direction of the air around the through opening when the aircraft is performing forward flight towards the front in the absence of wind and without sideslip, and the second portion extends outside the inside space in the flow direction over a second length that is longer than or equal to half the predetermined characteristic dimension.

11. The aircraft according to claim 1, wherein the at least two slots are symmetrical relative to the separator.

12. The aircraft according to claim 1, wherein the second portion extends in elevation over a height from a base to a top, the second portion extends longitudinally from a first end to a second end, and the height decreases on going from the first end towards the second end in application of a predetermined relationship for variation of the height.

13. The aircraft according to claim 1, wherein the second portion extends longitudinally from upstream to downstream of the through opening relative to the flow direction of the outside air relative to the aircraft, the separator being T-shaped.

14. The aircraft according to claim 13, wherein the through opening presents a predetermined characteristic dimension, the characteristic dimension being equal to the square root of the area of a projection of the through opening onto a projection plane, the projection plane being orthogonal to a flow direction of the air around the through opening when the aircraft is performing forward flight towards the front in the absence of wind and without sideslip, and the second portion extends outside the inside space in the flow direction over a second length that is longer than or equal to half the predetermined characteristic dimension, and wherein the through opening describes a disk that is centered on an axis of symmetry and that presents a diameter, the axis of symmetry separating an upstream segment from a downstream segment of the second portion, the upstream segment extending over an upstream extension length and the downstream segment extending over a downstream extension length, each of the upstream extension length and the downstream extension length being equal to the second length.

15. The aircraft according to claim 1, wherein the through opening is formed in the rear face of the top structural assembly such that the through opening does not face directly into an incident stream of air while the aircraft is advancing.

16. A method of treating a vibratory phenomenon of an aircraft having a static air inlet system for sucking in outside air present in a medium outside the aircraft and for conveying the outside air to at least one engine of a power plant of the aircraft, the method comprising:
providing the aircraft having a front segment that carries a main rotor contributing at least to providing the aircraft with lift, the aircraft also including a rear assembly; the aircraft extending longitudinally along an anteroposterior plane in a direction of forward advance from a rear end of the rear assembly to a nose of the front segment, the aircraft extending transversely from a first flank to a second flank on either side of the anteroposterior plane, the front segment having a top structural assembly situated under the main rotor,
forming a static air intake of the static air inlet system in a rear face, a first side face, a second side face, or a top face of a top structural assembly, the static air intake having a through opening, the through opening forming an interface between the outside medium and an inside space of the top structural assembly, the top structural assembly having the front face facing towards the nose and in the direction of forward advance, the rear face facing towards the rear assembly, the first side face connecting the front and rear faces, the second side face connecting the front and rear faces, and the top face facing towards the main rotor, and
arranging at least one separator subdividing the through opening into at least two distinct slots, the separator comprising a first portion extended by a second portion, the first portion extending inside the inside space and the second portion extending outside the inside space.

17. The method according to claim 16,
wherein the second portion extends in a longitudinal direction parallel to a flow direction of the outside air around the through opening while the aircraft is performing forward flight in the absence of wind and without sideslip.

18. The method according to claim 16, wherein the separator extends transversely in a transverse direction from a first separator side face to a second separator side face, the transverse direction being perpendicular to the anteroposterior plane, and the first separator side face and the second separator side face are arranged transversely on either side of the anteroposterior plane, and
wherein the first separator side face extends from a first front end edge to a first rear end edge, the second separator side face extends from a second front end edge to a second rear end edge and the separator has a rounded front end face connecting the first front end edge to the second front end edge, and also has a rounded rear end face connecting the first rear end edge to the second rear end edge.

19. An aircraft having a static air inlet system for sucking in outside air present in a medium outside the aircraft and for conveying the outside air to at least one engine of a power plant of the aircraft, the aircraft having a front segment that includes a main rotor contributing at least to providing the aircraft with lift, the aircraft also including a rear assembly; the aircraft extending longitudinally along an anteroposterior plane in a direction of forward advance from a rear end of the rear assembly to a nose of the front segment, the aircraft extending transversely from a first flank to a second flank on either side of the anteroposterior plane, the front segment having a top structural assembly situated under the main rotor, the static air inlet system comprising a static air intake, the static air intake having a through opening formed in the top structural assembly, the through opening forming an interface between the medium and an inside space of the top structural assembly,
wherein the static air inlet system has at least one separator subdividing the through opening into at least two distinct slots, the separator comprising a first portion extended by a second portion, the first portion extending inside the inside space and the second portion extending outside the inside space,
wherein the separator extends transversely in a transverse direction from a first side face to a second side face, the transverse direction being perpendicular to the anteroposterior plane, and the first side face and the second side face are arranged transversely on either side of the anteroposterior plane, and
wherein the first side face extends from a first front end edge to a first rear end edge, the second side face extends from a second front end edge to a second rear end edge and the separator has a rounded front end face connecting the first front end edge to the second front end edge, and also has a rounded rear end face connecting the first rear end edge to the second rear end edge.

20. An aircraft having a static air inlet system for sucking in outside air present in a medium outside the aircraft and for conveying the outside air to at least one engine of a power plant of the aircraft, the aircraft having a front segment that includes a main rotor contributing at least to providing the aircraft with lift, the aircraft also including a rear assembly; the aircraft extending longitudinally along an anteroposterior plane in a direction of forward advance from a rear end of the rear assembly to a nose of the front segment, the aircraft extending transversely from a first flank to a second flank on either side of the anteroposterior plane, the front segment having a top structural assembly situated under the main rotor, the top structural assembly having a front face facing towards the nose and in the direction of forward advance, a rear face facing towards the rear assembly, a first side face connecting the front and rear faces, a second side face connecting the front and rear faces, and a top face facing towards the main rotor, the static air inlet system comprising a static air intake, the static air intake having a through opening formed in the rear face, the first side face, the second side face, or the top face of the top structural assembly, the through opening forming an interface between the medium and an inside space of the top structural assembly,     wherein the static air inlet system has at least one separator subdividing the through opening into at least two distinct slots, the separator comprising a first portion extended by a second portion, the first portion extending inside the inside space and the second portion extending outside the inside space;

wherein the second portion extends longitudinally from upstream to downstream of the through opening relative to the flow direction of the outside air relative to the aircraft, the separator being T-shaped; and     wherein the through opening presents a predetermined characteristic dimension, the characteristic dimension being equal to the square root of the area of a projection of the through opening onto a projection plane, the projection plane being orthogonal to a flow direction of the air around the through opening when the aircraft is performing forward flight towards the front in the absence of wind and without sideslip, and the second portion extends outside the inside space in the flow direction over a second length that is longer than or equal to half the predetermined characteristic dimension, and wherein the through opening describes a disk that is centered on an axis of symmetry and that presents a diameter, the axis of symmetry separating an upstream segment from a downstream segment of the second portion, the upstream segment extending over an upstream extension length and the downstream segment extending over a downstream extension length, each of the upstream extension length and the downstream extension length being equal to the second length.

* * * * *